(12) United States Patent
Schaertel et al.

(10) Patent No.: US 8,472,092 B2
(45) Date of Patent: *Jun. 25, 2013

(54) METHOD OF SCANNING DOCUMENTS

(75) Inventors: David M. Schaertel, Webster, NY (US);
Daniel P. Phinney, Rochester, NY (US);
Marybeth Schmidt, Rush, NY (US);
Bruce A. Link, Rochester, NY (US);
Bruce A. Holroyd, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/858,498

(22) Filed: Aug. 18, 2010

(65) Prior Publication Data

US 2012/0044548 A1 Feb. 23, 2012

(51) Int. Cl.
*H04N 1/04* (2006.01)
*H04N 1/40* (2006.01)
*G06F 15/00* (2006.01)
*G06F 11/00* (2006.01)
*G06K 15/00* (2006.01)
*G06K 9/00* (2006.01)
*G03G 15/00* (2006.01)
*B65H 1/00* (2006.01)

(52) U.S. Cl.
USPC ............ 358/498; 358/474; 358/1.9; 358/448; 358/1.14; 382/135; 399/405; 271/171; 714/704

(58) Field of Classification Search
USPC ............ 358/498, 474, 1.9; 382/135; 399/405; 271/171; 714/704
See application file for complete search history.

(56) References Cited

U.S. PATENT DOCUMENTS

| 7,490,828 B2 | 2/2009 | Machida et al. | |
| 2003/0076518 A1 | 4/2003 | Miyake et al. | |
| 2005/0240376 A1 | 10/2005 | Uwatoko et al. | |
| 2006/0255531 A1* | 11/2006 | Azzopardi et al. | 271/171 |
| 2007/0153339 A1* | 7/2007 | Itoh | 358/498 |
| 2008/0013848 A1 | 1/2008 | Wu et al. | |
| 2009/0307542 A1* | 12/2009 | Roohparvar | 714/704 |

* cited by examiner

*Primary Examiner* — Charlotte M Baker
*Assistant Examiner* — Rury Grisham
(74) *Attorney, Agent, or Firm* — Nelson Adrian Blish

(57) ABSTRACT

A document scanner (10) includes an input tray (30) for holding documents (20) prior to imaging; an output tray (150) for holding documents after the documents exit the scanner; an output image capture device (140) for capturing images of the output tray; an image processor for determining characteristics of the output tray or characteristic of the documents after the documents exit the scanner; and scanner functions are modified based on the output tray characteristics or the document characteristics.

10 Claims, 2 Drawing Sheets

METHOD OF SCANNING DOCUMENTS

CROSS REFERENCE TO RELATED APPLICATIONS

Reference is made to commonly-assigned copending U.S. patent application Ser. No. 12/858,488 (now U.S. Publication No. 2012/0044547), filed Aug. 18, 2010, entitled A DOCUMENT SCANNER, by Schaertel et al.; U.S. patent application Ser. No. 12/839,476, (now U.S. Publication No. 2012/0019874), filed Jul. 20, 2010, entitled METHOD FOR DOCUMENT SCANNING, by Schaertel et al.; U.S. patent application Ser. No. 12/839,471, (now U.S. Publication No. 2012/0019841), filed Jul. 20, 2010, entitled A DOCUMENT SCANNER, by Schaertel et al.; and U.S. patent application Ser. No. 12/276,641 (now U.S. Publication No. 2010/0127447), filed Nov. 24, 2008, entitled DOCUMENT TRANSPORT APPARTUS, by Hammen; the disclosures of which are incorporated herein.

FIELD OF THE INVENTION

This invention relates to extracting properties of a document and the exit area characteristics as the document exits the scanner. This information is used to enable, disable, or improve features or functions of the scanner.

BACKGROUND OF THE INVENTION

A document scanner moves a document through a transport path and creates an image of the document as it moves. The processor for the document scanner has preset document characteristics and the operator must select functions and features to accommodate the specific requirements for a particular type of document. Alternately, the scanner may default to less efficient settings that will process all documents since scanners are not typically programmed with specific requirements on a document-by-document basis.

The preset characteristics include document characteristics such as size, weight, texture; and specific application requirements such as resolution and imaging mode, color, simplex, or duplex. In a document scanner, the documents to be scanned may vary by size, weight, color content, physical condition, or other characteristics, which may require different scanner features to be enabled or operator actions to be employed, for the most optimal and efficient mode of operation. Prior knowledge of these many different document attributes can enable the proper selection of scanner features to improve the efficiency of the scanning process or enable other features which may provide specific applications required by a particular type, style, or size of document. Prior knowledge of the documents physical condition can also prompt immediate action from the operator to protect the document or scanner or allow other features within the scanner to perform more reliably.

The exit area of the scanner is used for collecting the scanned documents as they exit the transport. A document must also exit the scanner, once it has been imaged, in an orderly fashion. By discerning document characteristics in the exit area as well as the exit area characteristics such as number of documents, the exit area features which control stacking and tracking can be managed.

There is a need, therefore, for detection of document characteristics after the document exits the transport path.

SUMMARY OF THE INVENTION

Briefly, according to one aspect of the present invention a document scanner includes an input tray for holding documents prior to imaging; an output tray for holding documents after the documents exit the scanner; an output image capture device for capturing images of the output tray; an image processor for determining characteristics of the output tray or characteristic of the documents after the documents exit the scanner; and scanner functions are modified based on the output tray characteristics or the document characteristics.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
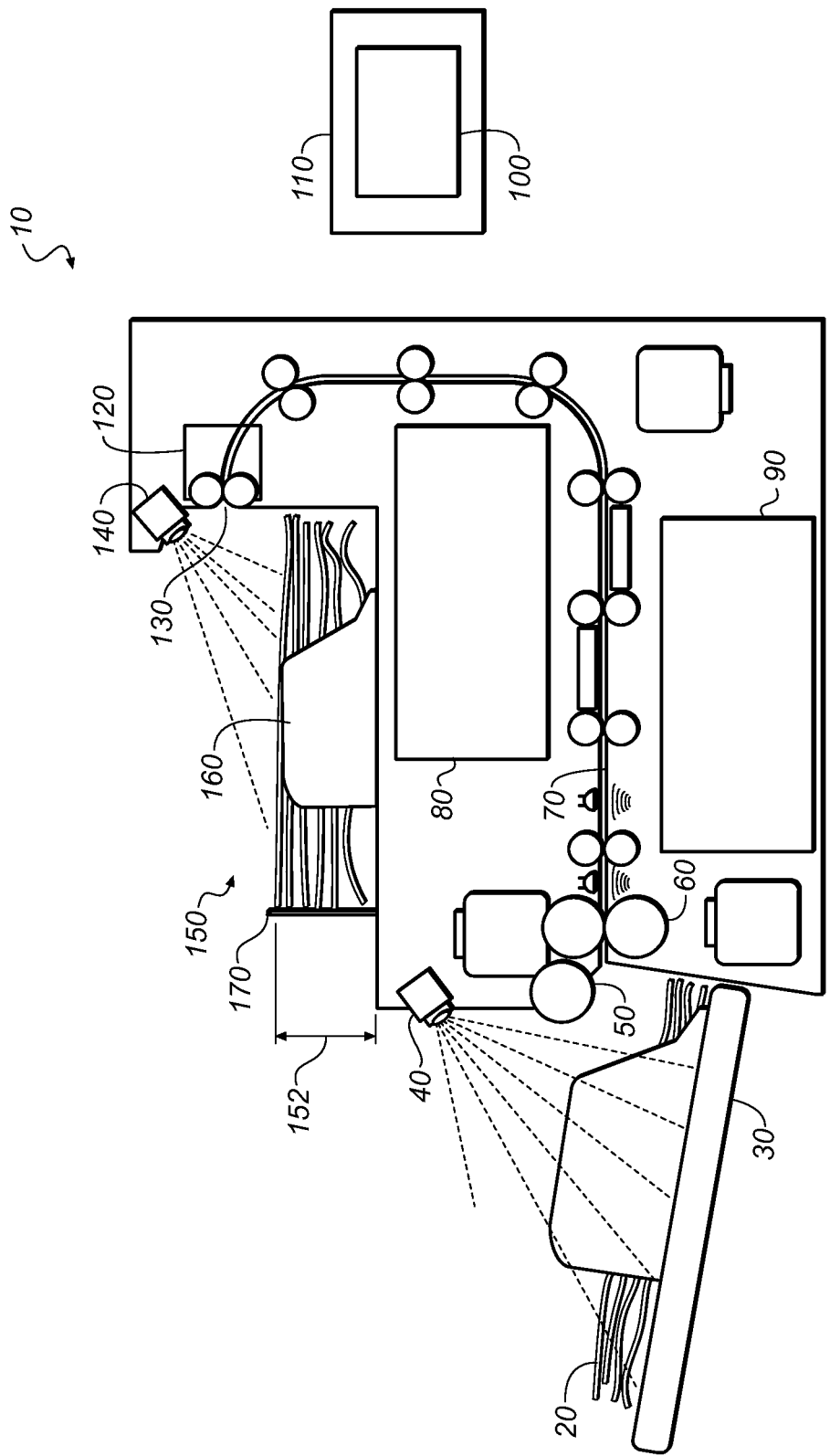
FIG. 1 is a cross-section view from the side of a document scanner according to the present invention.

FIG. 1 is a side cross-sectional view of a document scanner 10. As shown in FIG. 1, documents 20 are first placed in the input tray 30 of the scanner. The document is moved forward into the scanner by the feed roller 50 and separation roller 60. The document continues through the document transport 70, is imaged by the front and rear cameras 80 and 90 respectively, and then moves out of the transport exit 130 into the output tray 150.

As the document 20 exits the transport 70 at the transport exit 130, the document and the output tray 150 are imaged by the output imaging device 140. The images are sent to the image processor 100 to discern document 20 and output tray 150 characteristics.

One output tray characteristic is whether or not there are documents 20 present in the output tray 150. If the output tray 150 is determined to be empty the processor 110 will determine how many documents 20 can be scanned before the output tray 150 becomes full. Also determining the output tray 150 level of documents 152 will be used by the processor 110 to stop scanning if the output tray becomes full. This may happen if the operator continues to place documents in the input tray 30 while scanning without removing documents from the output tray 150.

Another important characteristic is the stacking of the documents 20 in the output tray 150. If the documents 20 are not laying flat, one on top of another, the processor 110 will stop the scanning process and prevent additional documents from stacking improperly. Improper stacking may be an indication of the controlled output stacking 120 feature not be operating properly or being inadvertently turned off. Based on the output tray 150 characteristics, proper adjustment of the output tray side guides 160 or end stop 170 will be determined. The scanning may be stopped for the operator to adjust the side guides or end stop, or an auto adjust feature can be employed to make the correction while scanning is continued.

Figure 2:
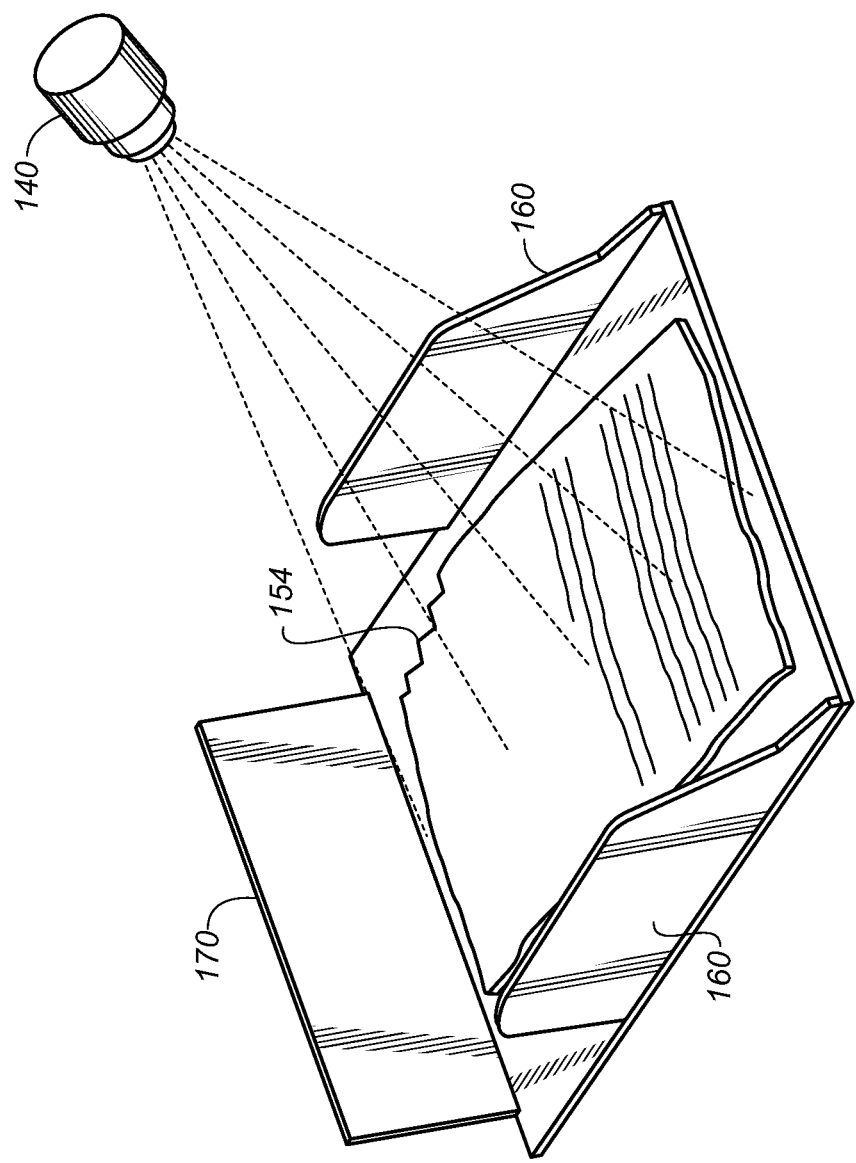
FIG. 2 is a perspective view of a scanner output tray.

Based on document information from an input imaging device 40 the number of documents entering the scanner is be compared to the number of documents exiting the scanner. The document condition exiting the scanner will also be compared to condition of documents entering the scanner to determine if damage to the document, such as bent or torn corners 154, is occurring within the document transport 70, as is shown in FIG. 2. The processor will then stop the scanning process and alert the operator.

Using the information from the input imaging device 40 the number of documents 20 entering the document scanner 10 can be compared to the number of documents 20 exiting the scanner. If the number of documents 20 exiting the document scanner 10 does not match the number of documents 20 entering the document scanner 10 the operator will be alerted to the lost document.

In a C-shape document transport the document order can be tracked using document content captured by the output imaging device 140 in conjunction with the rear camera 90. In a straight through document transport, the document order can be tracked using the document content captured by the output imaging device in conjunction with the front camera 80.

The invention has been described in detail with particular reference to certain preferred embodiments thereof, but it will be understood that variations and modifications can be effected within the scope of the invention.

PARTS LIST

10 document scanner
20 documents
30 input tray
40 input imaging device
50 feed roller
60 separation roller
70 document transport
80 front camera
90 rear camera
100 image processor
110 processor
120 controlled output stacking
130 transport exit
140 output imaging device
150 output tray
152 level of documents in the output tray
154 document with a torn corner
160 output tray side guides
170 end stop

The invention claimed is:

1. A method of scanning documents comprising:
   providing an input tray for holding documents prior to imaging;
   providing an output tray for holding documents after the documents exit the scanner;
   capturing images of the output tray with an output image capture device;
   determining characteristics of the output tray or characteristics of the documents after the documents exit the scanner; and
   modifying scanner functions based on said output tray characteristics or said document characteristics.

2. The method as in claim 1 comprising capturing images of documents in the input tray.

3. The method as in claim 1 wherein images of documents are captured as they exit the scanner.

4. The method as in claim 1 wherein images of the documents are captured after they exit the scanner.

5. The method as in claim 1 wherein one characteristic is whether or not the output tray is empty.

6. The method as in claim 1 wherein one characteristic is a level of documents in the output tray.

7. The method as in claim 1 wherein one characteristic is whether the documents are improperly stacked.

8. The method as in claim 7 comprising alerting an operator if the documents are improperly stacked.

9. The method as in claim 7 comprising determining if the documents are improperly stacked due to output tray side guides or end stop.

10. The method as in claim 1 comprising comparing the input condition of the document to the output condition of the document.

* * * * *